July 13, 1948.　　C. C. S. LE CLAIR　　2,445,227
LUBRICATION OF HIGH SPEED SHAFTS OR SPINDLES
Filed Oct. 12, 1944　　2 Sheets-Sheet 1

Inventor
Camille Clare Sprankling Le Clair
By
Williams, Bradbury & Hinkle
Attorneys July 13, 1948.                    C. C. S. LE CLAIR                    2,445,227
                    LUBRICATION OF HIGH SPEED SHAFTS OR SPINDLES
Filed Oct. 12, 1944                                               2 Sheets-Sheet 2
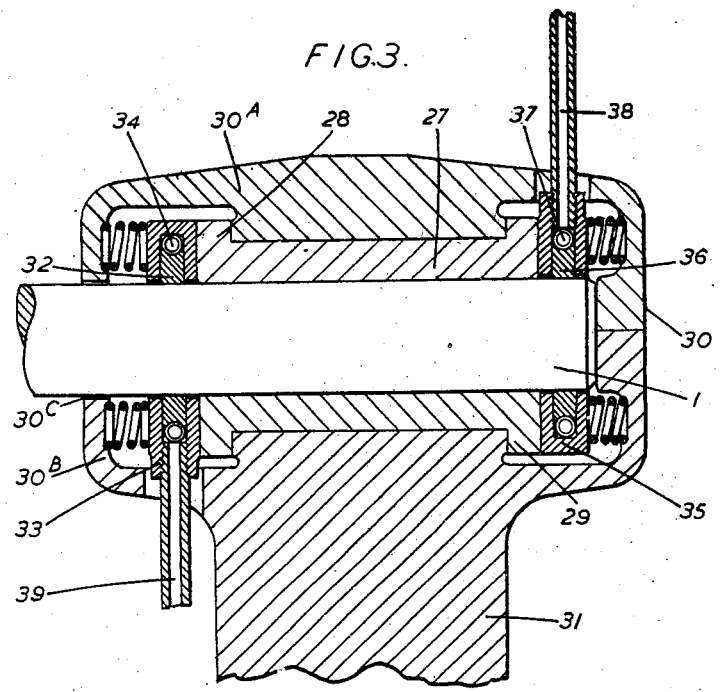
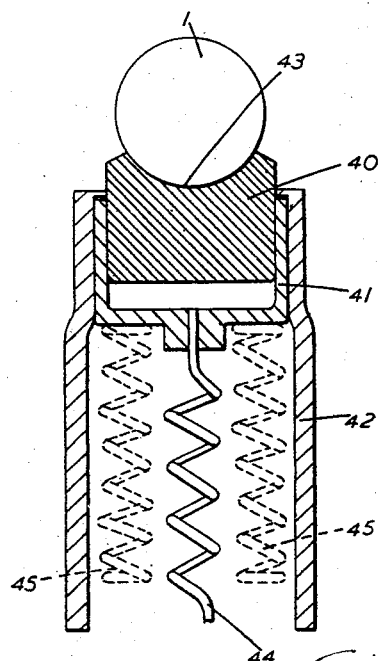
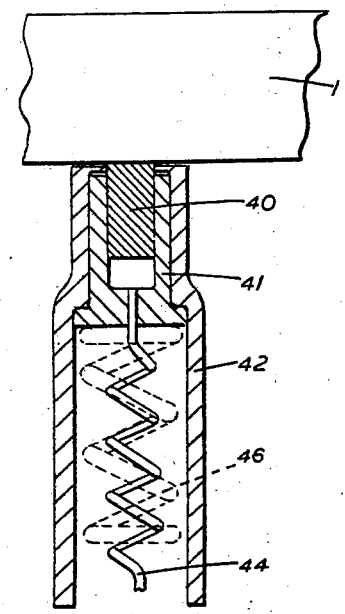
Inventor
Camille Clare Sprankling Le Clair
By
Williams, Bradbury & Hinkle
Attorneys.

Patented July 13, 1948

2,445,227

UNITED STATES PATENT OFFICE 2,445,227

LUBRICATION OF HIGH-SPEED SHAFTS OR SPINDLES

Camille Clare Sprankling Le Clair, Acton, London, England

Application October 12, 1944, Serial No. 558,323
In Great Britain November 17, 1943

16 Claims. (Cl. 308—36.3)

This invention relates to the lubrication of bearings in general, but more particularly to those used in connection with textile and similar machinery.

For the purpose of this specification, the whole art of lubrication may be said to be divided into two main methods. By the older method, bearings were fed with oil intermittently by hand or continuously by wick feed or a similar slow feeder or by ratchet-operated mechanical pumps. By this method, the quantity of oil supplied to a bearing was substantially equal to the net amount required to effect lubrication, i. e., sufficient to maintain an oil film in the bearing plus enough oil to make up the amount which unavoidably exudes from the ends of the bearing and spreads itself over the adjacent surfaces of the shaft or bearing pedestal, and which is hereinafter referred to in the following description as the "exudate." In many cases, such as for slow-running line shafting and so on, this method, although crude, serves a very useful purpose and where the exudate can either be caught in a suitable save-all or where it can fall into a disused space where, as its presence is not detrimental, it can be ignored.

By the second method, known generally as "forced lubrication," oil is forced by a pump under comparatively high pressure into the bearings. The amount of oil so pumped is greatly in excess of the net amount necessary to maintain an oil film in the bearings and hence the amount of oil passing out of the bearing as "exudate" becomes very large.

This method is only applied to high speed, highly-rated machinery, such as, aircraft engines, car engines, industrial power plants and so on, and, generally speaking, the speeds of rotation of the parts are such that the exudate will be flung about and it becomes necessary to enclose the rotating parts in oil-tight casings, not only to prevent mess, but also to collect the oil for re-use.

In many cases, however, particularly in textile machinery wherein shafting and spindles have to rotate at high speeds which make copious lubrication necessary, it is impossible to enclose them as described above for forced lubrication. At the same time it is vitally necessary that no exudate oil should be thrown about, because such oil would soil the textile yarns or fabrics under manufacture.

The object of this invention, therefore, is to overcome this difficulty and to provide a means which falls more or less between the two principal methods aforesaid, whereby not only can such bearings be provided with ample lubrication but also the exudate can be collected and prevented from being thrown about.

According to this invention, in or for a bearing assembly including at least one bearing which is rotatable about a shaft or in which a shaft is rotatably arranged, means are provided for supplying the bearing or bearings with oil under pressure, and other means are provided for withdrawing any excess of oil supplied to the bearing or bearings, which comprises at least one porous wiper or collector member which is arranged within or adjacent to the bearing assembly and pressed into close contact with the shaft and which is connected to a suction source adapted to create a slight vacuum, the porous wiper or collector member or members being spaced axially along the shaft from the oil-supplying means and being adapted to prevent the oil exudate from travelling along the shaft and being flung about at the exterior of the bearing assembly.

If so desired, the oil-supplying means may also consist of at least one porous oil-feeding member to which the oil is fed and which is arranged within the bearing assembly and pressed into close contact with the shaft.

The porous oil-feeding or collector member may either consist of a porous ring adapted to encircle the shaft or a porous plug which partly encircles the shaft, and, in either case, means, such as a spring or springs, may be provided for pressing the ring or plug into close contact with the shaft.

In either case also, the ring or plug may be made of porous metal or of a porous non-metallic substance and it is preferred to arrange it in a non-porous carrier which, according as to whether the ring or plug is feeding or collecting, is either connected to a source of oil or to a suction source. When a ring is used both the ring and the carrier may be made in segments in order to facilitate their assembly within the bearing assembly.

In the case of a bearing assembly having two open ends and supporting a straight-through shaft, oil may be supplied at the middle of the bearing or the actual bearing may be split into two parts and a porous ring or plug may be arranged in the gap between the adjacent ends of these two parts and connected to a source of supply of oil (which may be under pressure) while another porous ring or plug may be arranged at each end of the bearing assembly and connected to a suction source.

When oil is supplied through a porous plug instead of a ring it is not necessary to cut the bearing into the parts as mentioned above merely to cut away a gap sufficiently large to admit the plug to contact with the shaft.

In a bearing assembly having a closed end and applied to the end of a shaft, there may be two porous rings or plugs, one arranged at or near the closed end of the bearing assembly and connected to a source of supply of oil under pressure and the other at or near the open end of the assembly and connected to a suction source. Alternatively, oil may be supplied to the closed end of the bearing by means other than the porous ring or plug herein described.

The accompanying drawings show, by way of example, several constructional forms of the invention as applied to the lubrication of a high speed spindle or shaft. On the drawings—

Fig. 3 is a sectional elevation of another bearing pedestal having a closed end, the bearing assembly including a porous metal oil-feeding ring and a porous metal suction ring;

Fig. 4 is a sectional view of an alternative construction of segmental porous plug which is pressed into close contact with the shaft partly or wholly by a coiled oil feed pipe acting as a spring; and Fig. 5 is a sectional view at right angles to Fig. 4, showing an alternative arrangement of springing.

Figure 1:
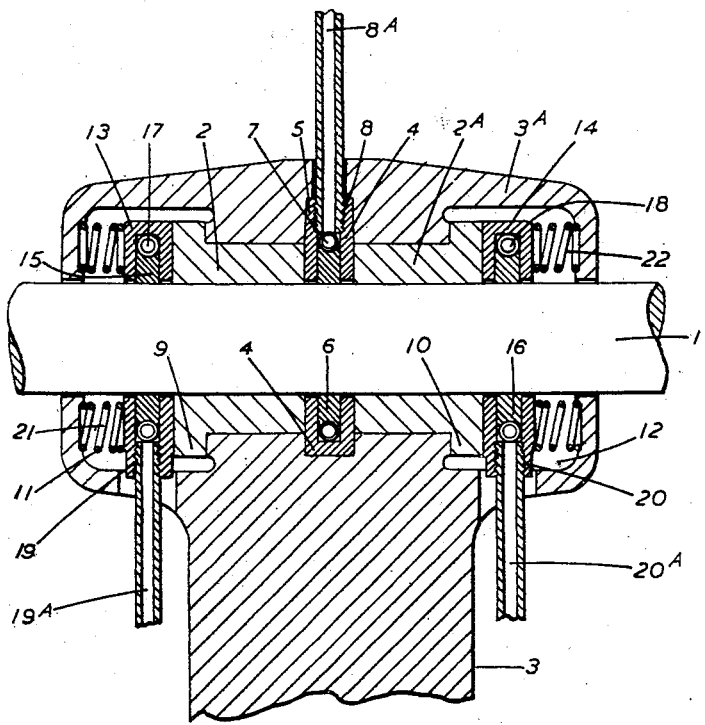
Fig. 1 is a sectional elevation of a bearing pedestal for a straight-through shaft, the bearing assembly including a single porous metal oil-feeding ring and two porous metal suction rings.

Referring to Fig. 1:

The shaft 1 is turnably arranged in two bearing bushes 2 and 2A arranged in the bearing pedestal 3 and its cap 3A, an annular gap being left between the inner ends of the bearing bushes. An annular recess 4 is formed partly in the pedestal and partly in the cap, the said recess surrounding the gap between the bearing bushes. In the said recess is fitted an annular, hollow non-porous carrier 5 which is apertured centrally to allow the shaft to pass through it and in the interior of the carrier there is an annular, porous metal ring 6 which surrounds the shaft and is made in two or more segments to facilitate assembly. The ring is held in pressure-tight contact with the shaft by means of a garter spring 7 fitted in the said carrier and surrounding the ring. The carrier is formed with an inlet orifice 8 in which is fitted the end of an oil supply pipe 8A passing through a hole in the pedestal cap.

The outer ends of the said bearing bushes are provided respectively with flanges 9 and 10 and in the annular spaces 11 and 12 between the latter and the ends of the bearing pedestal 3 and cap 3A there are assemblies of non-porous carriers 13 and 14 enclosing porous metal rings 15 and 16 and garter springs 17 and 18 as described above. These two carriers are also formed respectively with orifices 19 and 20 into which pipes 19A and 20A, passing through holes in the pedestal 3, are fitted. The carriers are also held against the flanges 9 and 10 on the adjacent bearing bushes respectively by a number of springs 21 and 22 fitted between the outer faces of the carriers and the inner end faces of the bearing pedestal and cap. Each of the pipes 19A and 20A connected to the end carriers 13 and 14 is also connected to a suction source (not shown) capable of producing a slight vacuum in the carrier.

Oil is fed into the central carrier 5 through the said oil inlet pipe 8A which is connected to a source of oil under pressure. From the interior of the central carrier oil passes through the porous metal ring 6 to the shaft 1, along which it travels lengthwise in both directions throughout the length of the bearing. Excess of oil is removed by the suction through the two porous rings 15 and 16 situated in the carriers 13 and 14 at the ends of the bearing bushes, these porous rings acting as continuous wipers to collect the exudate and prevent it being thrown about.

If desired, the carriers may be made in segments or held together by tangent screws.

Figure 2:
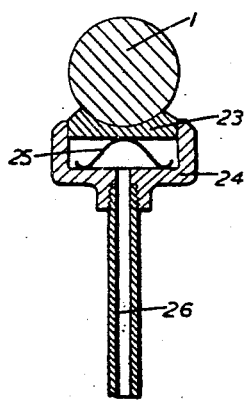
Fig. 2 is a sectional view of a segmental plug of porous metal, which is adapted to replace any one of the porous metal rings shown in Fig. 1.

Fig. 2 shows how each porous ring and its carrier may be replaced by a segmental porous plug 23 fixed in a segmental housing or carrier 24 arranged in the bearing pedestal. The said garter spring is replaced by a leaf spring 25 acting to press the plug into contact with the shaft 1. A pipe 26, which is connected to the oil source or to the source of suction, is screwed into the carrier 24 and communicates with the interior thereof.

Fig. 3 shows the application of the invention to the lubrication of a bearing 27 in which one end of a shaft 1 is rotatably supported, the outer ends 30 of the pedestal cap 30A and pedestal 31 being closed and the inner ends 30B being formed with an opening 30C through which the shaft projects. In this construction, the bearing comprises two end flanges 28 and 29 and between the flange 28 and the adjacent ends of the pedestal cap 30A and pedestal 31 there is arranged a porous metal ring 32 lodged in a non-porous carrier 33 and encircled by a garter spring 34. A non-porous carrier 35 is arranged between the bearing flange 29 and the adjacent ends 30 of the pedestal cap and pedestal and a porous metal ring 36 and a garter spring 37 are arranged in this carrier. An oil inlet pipe 38 is connected to the carrier 35 so as to supply oil to the ring 36 and the exudate is withdrawn from the wiper ring 32 at the opposite end of the bearing through a pipe 39 connected to a suction source.

In the modified construction shown in Figs. 4 and 5, a porous metal plug 40 is soldered into, and forms an oil tight fit with, a non-porous carrier 41 slidable within a housing 42 which is arranged within the pedestal and/or cap. The plug 40 projects outwards from the carrier 41 and it is formed with an arcuate recess 43, curved to the radius of the shaft 1. The plug is pressed against the shaft by means of a capillary or small sized oil feed pipe 44, one end of which is connected to, and communicates with the interior of, the carrier 41. The pipe is coiled as shown to act as a spring, but should it not be sufficiently strong its action may be supplemented by one or more springs arranged non-coaxially around it as shown in broken lines at 45 in Fig. 4, or alternatively by one or more springs 46 arranged coaxially around it as shown in broken lines in Fig. 5.

It will be appreciated that a similar arrangement may be used for withdrawing the exudate, in which case the coiled pipe 44 will be connected to a suction source.

One or more porous oil-feeding or wiper rings may be used in a bearing assembly in association with one or more oil-feeding or wiper plugs.

As a further modification, either the porous ring or the segmental porous plug may be preformed in situ and heat treated by known methods so that it becomes integral with the housing or carrier.

As yet further modifications, non-metallic porous material, such as felt, asbestos or fibre, may be substituted for the porous metal from which the porous ring or the porous segmental plug are formed.

The oil feed to the inlet pipes, may be continuous or intermittent. In the latter case, the inlet pipe may be connected to a pump having an intermittent discharge, the porous metal then acting as a sponge or wick which receives the oil intermittently but rubs it on the surface of the shaft continuously.

The application of the invention to a bearing assembly which is rotatable about a shaft will be well understood by those skilled in the art without further description.

I claim:

1. Apparatus for withdrawing any excess of oil supplied to a bearing rotatably supporting a shaft, including in combination, a porous wiper and oil collector in contact with the shaft in proximity to the bearing, and means including a suction conduit in communication with said porous wiper and collector for creating a slight vacuum therein, whereby oil exudate is removed from the surface of the shaft and prevented from traveling along the shaft beyond said wiper and collector.

2. Apparatus for withdrawing any excess of oil supplied to a bearing rotatably supporting a shaft, including in combination, a porous wiper and oil collector in contact with the shaft in proximity to the bearing, means biasing said wiper and collector into close contact with the shaft, and means including an oil conduit in communication with said porous wiper and collector and a source of suction for creating a slight vacuum in said wiper and collector and removing oil exudate from the surface of said shaft and preventing it from traveling along said shaft beyond said wiper and collector.

3. Apparatus for withdrawing any excess of oil supplied to a bearing rotatably supporting a shaft, including in combination, a porous wiper and oil collector ring encircling and in contact with the shaft in proximity to the bearing, and means including an oil conduit in communication with said ring and a source of suction for creating a slight vacuum in said ring and removing oil exudate from the surface of said shaft and preventing it from traveling along said shaft beyond said ring.

4. Apparatus for withdrawing any excess of oil supplied to a bearing rotatably supporting a shaft, including in combination, a porous wiper and oil collector plug partially encircling and in contact with the shaft, and means including an oil conduit in communication with said plug and a source of suction for creating a slight vacuum in said plug and removing oil exudate from the surface of said shaft and preventing it from traveling along said shaft beyond said plug.

5. Apparatus for withdrawing any excess of oil supplied to a bearing rotatably supporting a shaft, including in combination, a porous wiper and oil collector in contact with the shaft, and means including an oil conduit in communication with said porous wiper and collector and a source of suction for creating a slight vacuum in said wiper and collector and removing oil exudate from the surface of the shaft through said wiper and collector, said wiper and oil collector comprising a segmental ring surrounding the shaft and elastic means encircling the ring to urge it into close contact with the shaft.

6. Apparatus for withdrawing any excess of oil supplied to a bearing rotatably supporting a shaft, including in combination, a porous wiper and oil collector in contact with the shaft, and means including an oil conduit having a coiled portion serving as a spring and in communication with said porous wiper and collector for biasing the latter into close contact with the shaft and a source of suction connected to said conduit for creating a slight vacuum in said wiper and collector and removing oil exudate from the surface of the shaft through said wiper and collector.

7. Apparatus for withdrawing any excess of oil supplied to a bearing rotatably supporting a shaft, including in combination, a non-porous carrier adjacent the bearing encircling the shaft and having a recess therein, an oil conduit communicating with said recess, and means including a porous wiper and oil collector in said recess and in contact with the shaft and a source of suction for removing oil exudate from the surface of the shaft.

8. Apparatus for withdrawing any excess of oil supplied to a bearing rotatably supporting a shaft, including in combination, a non-porous carrier adjacent the bearing encircling the shaft and having a recess therein, an oil conduit communicating with said recess, a porous wiper and oil collector in said recess and adapted to contact the shaft, a source of suction connected to said conduit for maintaining a slight vacuum in said wiper and collector and removing exudate from the surface of the shaft through said wiper and collector and said conduit, and elastic means in said carrier encircling said wiper and collector for biasing it into close contact with the shaft.

9. Apparatus for withdrawing any excess of oil supplied to a bearing rotatably supporting a shaft, including in combination, structure defining a recess, a porous wiper and oil collector in said recess integral with said structure, said wiper and collector being in contact with the shaft, and means including an oil conduit in communication with said porous wiper and collector and a suction conduit creating a slight vacuum in said wiper and collector and removing oil exudate from the surface of the shaft through said wiper and collector.

10. Apparatus for withdrawing any excess of oil supplied to a bearing rotatably supporting a shaft, including in combination, a non-porous housing adjacent the bearing and having a recess therein, a porous wiper and oil collector in said recess and in contact with the shaft, a non-porous carrier slidably mounted in said recess supporting said wiper and collector in said recess, a source of suction, and an oil conduit connecting said source with the interior of said carrier and said wiper and collector.

11. Apparatus for withdrawing any excess of oil supplied to a bearing rotatably supporting a shaft, including in combination, a non-porous housing adjacent the bearing and having a recess therein, a non-porous carrier slidably mounted within said recess, a porous wiper and oil collector mounted in said carrier, a source of suction, an oil conduit connecting said source with the interior of said carrier and said wiper and collector, and means for resiliently biasing said carrier toward the shaft to maintain said wiper and collector in contact with said shaft.

12. Apparatus for withdrawing any excess of oil supplied to a bearing rotatably supporting a shaft, including in combination, a non-porous housing adjacent the bearing and having a recess therein, a non-porous carrier slidably mounted within said recess, a porous wiper and oil collector mounted in said carrier, a source of suction, and means including a resilient oil conduit for resiliently biasing said carrier toward the shaft to maintain said wiper and collector in contact with said shaft and for connecting said wiper to said source of suction to create a slight vacuum in said piper and oil collector to remove oil exudate from the surface of the shaft.

13. Apparatus as claimed in claim 12, wherein said resilient oil conduit is a helical conduit and including a pair of additional helical springs located adjacent said conduit for additionally biasing said carrier toward the shaft.

14. Apparatus as claimed in claim 12, wherein said oil conduit is a helical one and including a helical spring surrounding said conduit for additionally biasing said carrier toward the shaft.

15. Apparatus as claimed in claim 1, wherein said porous wiper and oil collector comprises porous metal.

16. Apparatus as claimed in claim 1, wherein said porous wiper and oil collector comprises non-metallic material.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 974,966 | Holtorp | Nov. 8, 1910 |
| 1,562,019 | Wilkinson | Nov. 17, 1925 |
| 1,840,127 | Penney | Jan. 5, 1932 |
| 2,299,119 | Yeomans | Oct. 20, 1942 |